United States Patent
Shtein

(10) Patent No.: US 11,106,448 B2
(45) Date of Patent: Aug. 31, 2021

(54) MANAGEMENT OF UPDATES TO EXTERNALLY MANAGED LIBRARIES

(71) Applicant: Red Hat Israel, Ltd., Ra'anana (IL)

(72) Inventor: Semion Shtein, Ra'anana (IL)

(73) Assignee: Red Hal Israel, Ltd., Ra'anana (IL)

( * ) Notice: Subject to any disclaimer, the term of this patent is extended or adjusted under 35 U.S.C. 154(b) by 0 days.

(21) Appl. No.: 16/103,005

(22) Filed: Aug. 14, 2018

(65) Prior Publication Data
US 2020/0057622 A1 Feb. 20, 2020

(51) Int. Cl.
*G06F 8/65* (2018.01)
*G06F 8/71* (2018.01)
*G06F 11/36* (2006.01)
*H04L 29/08* (2006.01)
*G06F 8/30* (2018.01)

(52) U.S. Cl.
CPC .............. *G06F 8/65* (2013.01); *G06F 8/30* (2013.01); *G06F 8/71* (2013.01); *G06F 11/3604* (2013.01); *H04L 67/34* (2013.01)

(58) Field of Classification Search
CPC ..... G06F 8/20; G06F 8/33; G06F 8/36; G06F 8/65; G06F 8/70; G06F 8/71; G06F 8/72; G06F 11/3604
See application file for complete search history.

(56) References Cited

U.S. PATENT DOCUMENTS

| 7,966,602 B1* | 6/2011 | Webster ..................... G06F 8/48 717/114 |
| 8,166,451 B2 | 4/2012 | Gutz |
| 8,996,349 B2 | 3/2015 | Belenky et al. |
| 8,997,055 B2 | 3/2015 | van Gogh et al. |
| 9,052,966 B1* | 6/2015 | Quinlan ............... G06F 9/45516 |
| 9,652,314 B2 | 5/2017 | Mahiddini |
| 9,787,779 B2 | 10/2017 | Frank et al. |
| 2008/0052684 A1* | 2/2008 | Bowdidge ................ G06F 8/72 717/136 |
| 2009/0019426 A1* | 1/2009 | Baeumer ................... G06F 8/71 717/122 |
| 2010/0299663 A1* | 11/2010 | Weissman ................. G06F 8/71 717/170 |
| 2011/0022809 A1* | 1/2011 | Satoh .................. G06F 9/45533 711/155 |
| 2015/0082016 A1* | 3/2015 | Bonczkowski ..... G06F 9/44505 713/100 |
| 2016/0335168 A1 | 11/2016 | Freiberg et al. |

OTHER PUBLICATIONS

Deniz "Software Component Score: Measuring Software Component Quality Using Static Code Analysis", Aselan Electronics, Inc., Jun. 2015.
Rotibi "The Business Value of Software Static Analysis", Macehiter Ward-Dutton Limited, Aug. 2008.

* cited by examiner

*Primary Examiner* — Duy Khuong T Nguyen
(74) *Attorney, Agent, or Firm* — Womble Bond Dickinson (US) LLP

(57) ABSTRACT

A core management system identifies changes to a function signature of an instruction in a core framework of a computer program, generates a static code analysis rule indicating the change to the function signature in the computer program, and distributes the rule to one or more consumer systems using the core framework with an update to the core framework.

18 Claims, 5 Drawing Sheets

MANAGEMENT OF UPDATES TO EXTERNALLY MANAGED LIBRARIES

TECHNICAL FIELD

Aspects of the present disclosure relate to updates to externally managed libraries.

BACKGROUND

Computer devices may execute code that uses libraries that are externally managed and may change over time. Those changes can affect operation of executing code.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
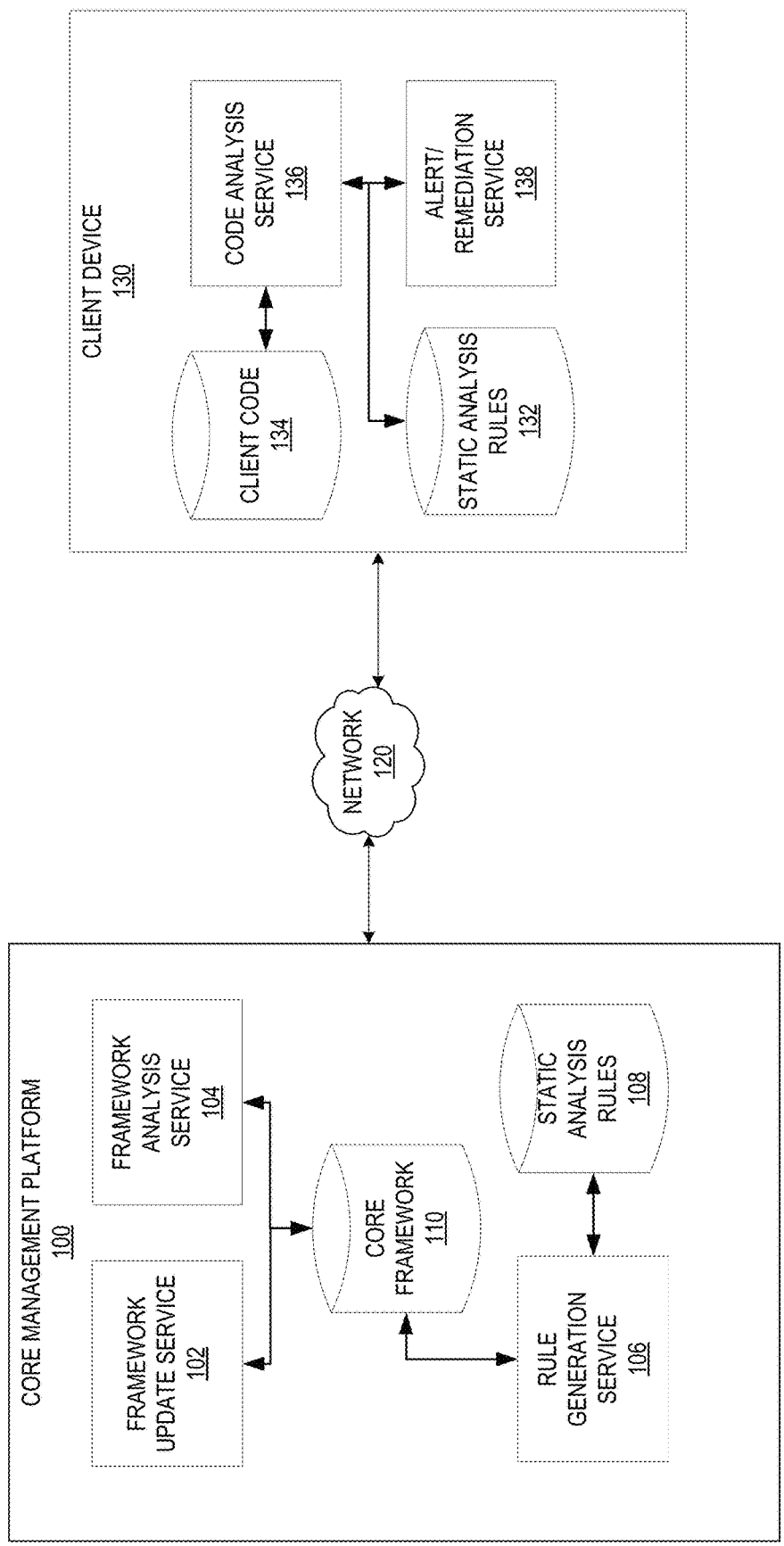
FIG. 1 is a block diagram that illustrates an example of a core management platform in accordance with some aspects of the present disclosure.

Disclosed herein are systems to improve distribution and adaptation to changes to externally managed libraries. During development of computer programs, it is common practice to use previously generated core frameworks to reduce the amount of work required to generate new programs. For instance, rather than developing a back-end framework, a developer can use the back-end framework and provide new instructions that use the back-end framework in order to provide functionality of a new product. However, changes to the back-end framework can have consequences on a program that calls one or more libraries associated with that framework. For example, externally managed libraries may be called by code executing on a client device. If there has been a change to one of the externally managed libraries, the change can affect the operation of executing code.

While some change to the operation of a function called by the executing code may have minimal impact on the operation of the code itself, other changes can prevent a program from executing at all. For example, changes to a function signature in an externally managed library may have a larger effect. A function signature can include input and output parameters of the function, parameter types of the function, exceptions of the function, or information about the availability of the function. Changes that impact the function signature can case the executing code to provide more, fewer, or different parameters than the function is expecting. Accordingly, the computing device will not be able to execute the instruction properly if it is using an incorrect function signature.

As externally managed libraries are updated, often there is a release file or update to corresponding documentation that indicates which code has been changed and how it has been changes. However, many developers cannot or do not keep track of all of the changes to the code and therefore may include instructions in their code that do not operate properly when calling functions from externally managed libraries. This can result in the code not operating correctly for devices executing the code.

The present disclosure addresses the above-noted and other deficiencies by introducing a more efficient mechanism to automate analysis of code that uses externally managed libraries. A code management platform may manage a core framework that is used by external users to develop computer programs. The core framework may comprise a number of libraries that are managed by the code management platform. As those libraries are updated, a framework analysis service may determine where changes to the core framework are made, and whether those may impact the operation of programs that use the core framework. For instance, the framework analysis service may determine that a change may impact the operation of a program in response to identifying a function signature change such as the type or number of parameters, exceptions, or the like. One such example is identification of a change to the function signature of one or more libraries.

If the framework analysis service determines that the change will impact the operation of a program calling the function, the code management platform can generate a rule that identifies calls to that function. The framework analysis service then distributes that rule to consumers of the core framework for analysis of the consumer's code. For example, the rule may be a static code analysis rule that analyzes the consumer's code to determine whether there is a call to a function with a changed function signature. In some embodiments, the rule may then generate an alert or notification that is provided to a developer of the code. The rule may also include a script that automatically provides remediation so that the code will operate with the correct function signature. In some embodiments, when generating the rule, the core management platform may determine whether to generate a rule with an alert, a remediation script, or both based on the type of change that is made. For example, if a parameter is removed from the function signature, a remediation script may be generated to change the call to the function in the code. If a parameter is added to the function signature, an alert or notification may be provided that indicates there may be a problem. Various changes to a function signature or other aspect of code may be resolved with a combination of notifications or scripts that execute in response to the rule identifying the function signature.

In some embodiments, the core management platform may provide the rules with updates to a core framework. For example, when a new distribution of the core framework is provided to consumers of the core framework, a set of rules may be included that execute automatically to provide the consumers with an indication of potential issues with their code in response to the new framework. The core management platform may also provide rules prior to a new distribution of the core framework, as part of the core framework, or make them accessible to consumers attempting to improve their code.

FIG. 1 is a block diagram depicting an example of a core management platform 100 operating to identify changes to a core framework 110, generating rules based on those changes, and distributing those rules to client devices 130 that utilize libraries of the core framework 110 during execution. The core management platform 100 may include a framework update service 102, a framework analysis service 104, and a rule generation service 106 that generate static analysis rules 108. In some embodiments, each component of the core management platform 100 may operate to update and analyze the core framework 110.

In some embodiments, the core framework 110 includes a number of functions that can be called by code within the framework or used by developers to build programs that user one or more aspects of the core framework 110. The core framework 110 may have multiple versions that are update over time and may be continually developed even after adoption by one or more consumers of the core framework 110. Accordingly, additional versions or updates to the core framework 110 may be distributed to such consumers or consumers may call functions in the core framework 110 that have changed. While these updates may often allow continued execution of code with small changes in internal functioning or addition features, some updates may alter the execution of a function as a whole.

In some embodiments, framework update service 102 may enable updates to the core framework 110. In some embodiments, framework updates service 102 may be an interface through which one or more developers using the core management platform 100 can make updates to the core framework 110. The framework update service 102 may also include one or more features requiring certain conditions to be met before an update to the core framework 100 is made. For example, the framework update service 102 may compile proposed updates to the core framework 110 periodically with the proposed updates. In some embodiments, the framework update service 102 provides an indication to a framework analysis service 104 when updates are made, which libraries the updates are made to, which function the updates are made to, or other information indicating the location or types of updates that are made to the core framework 110.

In some embodiments, a framework analysis service 104 may further determine where updates have been made and the type of updates that have been made. For example, the framework analysis service 104 may compare an updated version of the core framework 110 to previous versions of the core framework 110. In some embodiments, the changes or location of changes may be provided by the framework update service 102. The framework analysis service 104 can then determine whether or not those updates will change the operation of the core framework 110 when used by a consumer of the code. For example, the framework analysis service may determine whether or not a function signature of one or more functions of the core framework 110 has changed based on the updates.

In some embodiments, a rule generation service 106 generates rules based on the result of the framework analysis service 104. For example, the analysis may indicate that a particular function has been changed and a manner in which it has been changed. For example, the analysis may indicate that a function signature includes fewer or additional parameters, has a change to the parameter type, or other changes to the function signature. In some embodiments, the rule generation service 106 then generates a rule accordingly. For example, the rule generation service 106 can generate a rule based on a template for the type of change. The rule generation service 106 can generate a rule that is triggered based on a function name and format within code of a consumer of the core framework 110, for instance. In some embodiments, the rule generation service 106 can also generate a remediation script based on the analysis. For example, if a parameter is removed from the function signature, the rule generation service 106 can generate a script that is triggered by the rule to update the function call in the consumer's code based on the removed parameter. Additional remediation scripts can be generated for other changes to function signatures.

The core management platform 100 may store the generate rules in a static analysis rules repository 108. In some embodiments, various rules for different versions of the core framework 110 may be stored or rules may be stored for a set amount of time. The core management platform 100 may communicate over network 120 to one or more client devices 130. The client devices 130 may include client code 134 that calls functions included in libraries of the core framework 110. When the client code 134 is compiled it can include references to functions of the core framework 110 that are used when the client code 134 is executed. The client devices 130 can also receive static analysis rules 132 that can be used by a code analysis service 136 to analyze the client code 134. An alert or remediation service 138 then generates one or more alerts or changes to the client code 134 based on the results of the code analysis service 136.

In some embodiments, the code analysis service 136 accesses static analysis rules 132 that are received from the code management platform 100. The static analysis rules 132 may include a subset of the static analysis rules 108 from the code management platform 100. For example, the rules may only include those generated since a last analysis performed by the client device 130. In addition, the static analysis rules 132 may only include those relevant to libraries that are loaded by the client code 134.

The code analysis service 136 applies the rules using static code analysis to the client code 134. The static code analysis can trigger if a static analysis rule 132 matches a function in the client code. For example, a static analysis rule 132 may trigger if a function signature in the client code 134 does not conform to a new function signature in the core framework 110. In response to the trigger, the alert or remediation service 138 can generate a notification or alert.

In some embodiments, the alert or remediation service 138 executes a remediation script associated with the static analysis rule 132 as well to update the client code 134 to conform to the new function signature. Additionally, the alert or remediation service 138 can generate a notification that requests permission to update the client code 134 or provides a recommendation of how to update the client code 134 prior to performing a remediation script The alert or remediation generator 138 may also generate a user interface to provide a recommendation to update a script based on the static analysis rule 132. In some implementations, the alert or remediation generator 138 may generate a user interface including a update and options for implementing changes accordingly. For example, the user interface may enable a user or administrator to provide an affirmative response indicating to go forward with an update. The alert or remediation generator 138 may provide additional options, such as editing a recommended script or otherwise enabling a user or administrator to improve the recommended script. In some implementations, the script analysis service may proceed with updating a script without providing a user interface requesting feedback. The alert or remediation generator 138 may provide the generated user interface to the client device 130, to another device associated with the client device 130, to an account associated with the client device 130, or to a user or administrator associated with the client device 130. In some implementations, the alert or remediation generator 138 may provide the user interface as an email, a text message or other message, through a computer application, or through any other device or application able to provide an indication of the script and available options to a user or administrator. In some implementations, a user or administrator may access the user interface by affirmatively opening an application, web portal, or other system to view recommendations improving operations of a computer system.

Figure 2:
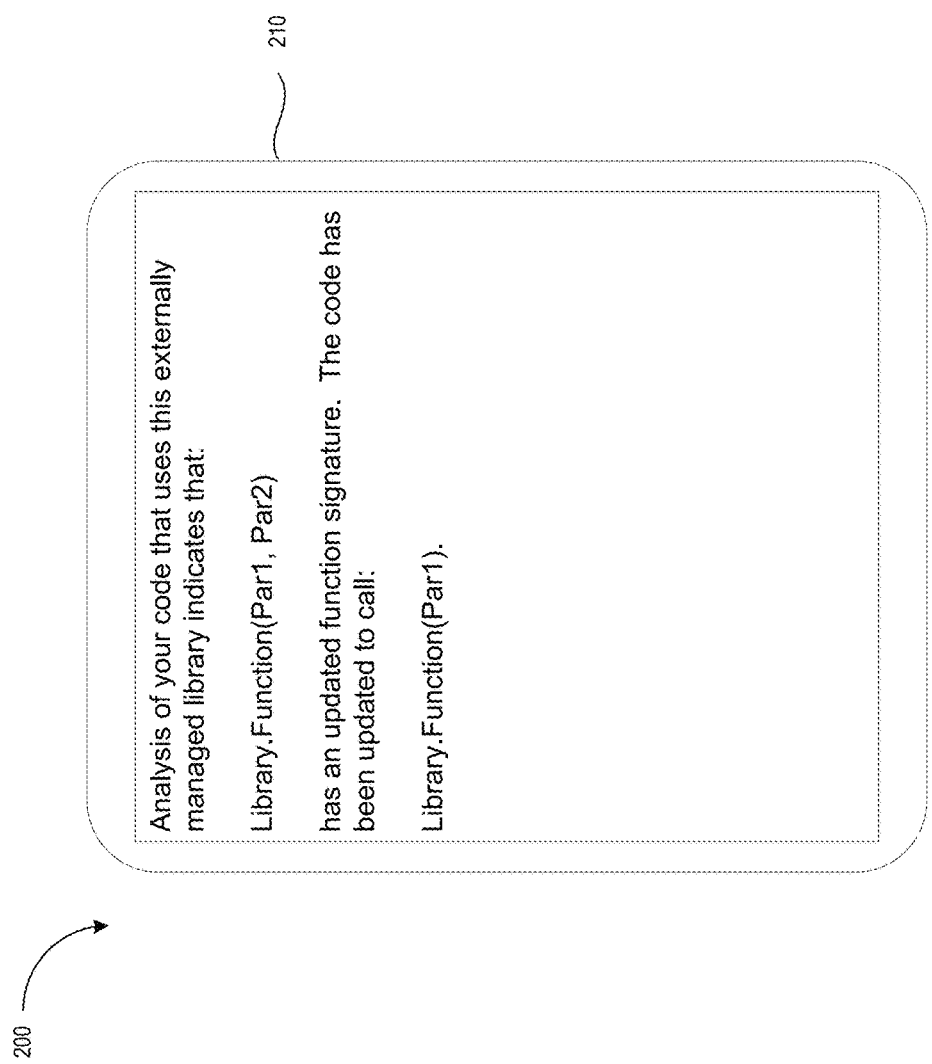
FIG. 2 is a user interface generated in accordance with some aspects of the present description.

FIG. 2 is an example user interface 200 in accordance with some aspects of the present description. For example, the user interface 200 may have been generated by a alert or remediation generator 138 as described with reference to FIG. 1. In some implementations, the user interface may appear different or have different features than those shown example user interface 200. In some implementations, the user interface includes a prompt 210 offering a notification of a change to a function signature of code used by a client device. The prompt 210 may include a notification that an update affects the operation of a consumer's code, a question whether to implement a remediation script or a recommendation to update the consumer's code. A client device 130 may automatically update the consumer's code or only update the consumer's code based on a selection received through the user interface 200.

In some implementations, the user interface 200 may include additional features or options. For example, the user interface may include user interface elements that upon activation enable confirming or rejecting the recommended script, editing a recommended script, updating the time, date, or other triggering event of the recommended script, or otherwise enabling a user or administrator to improve the recommended script.

Figure 3:
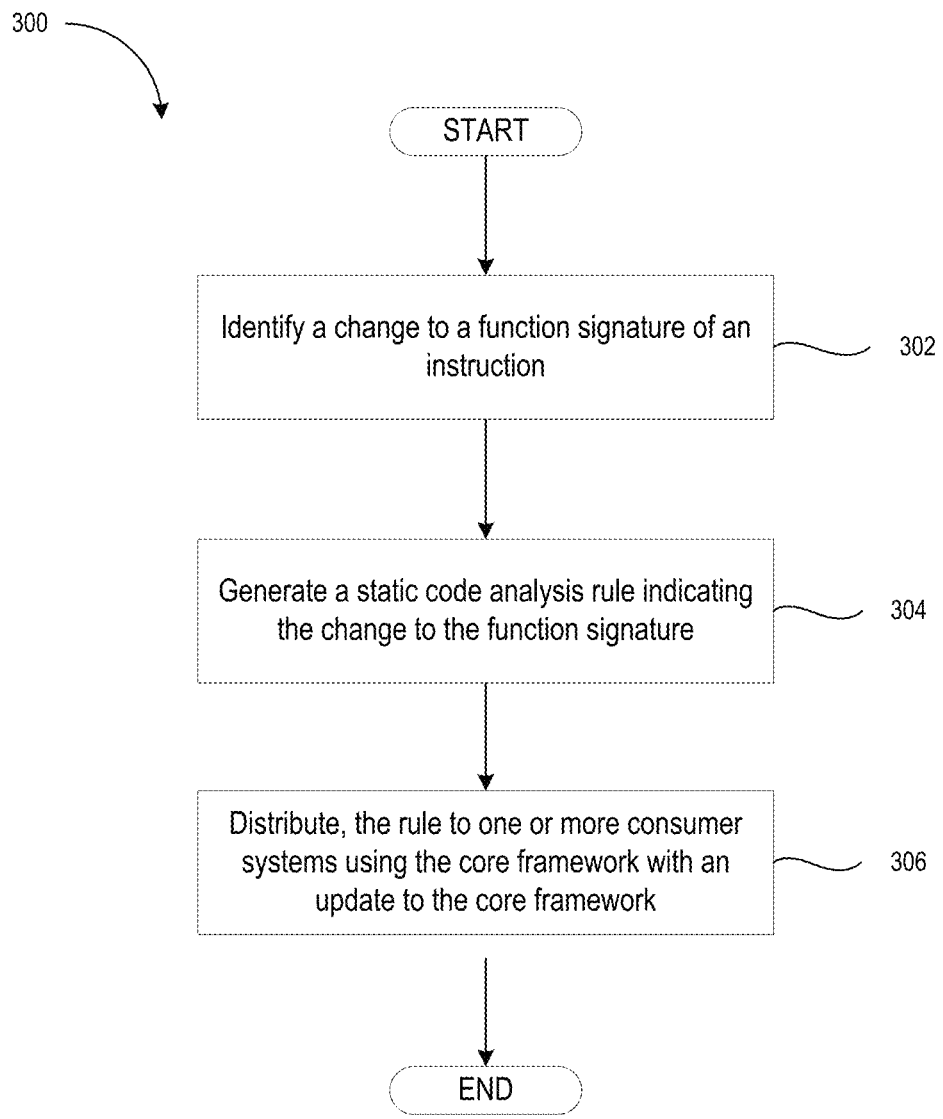
FIG. 3 is a flow diagram that illustrates an example method of analyzing changes to a core framework, in accordance with some aspects of the present disclosure.

FIG. 3 is a flow diagram illustrating an example method 300 of generating rules in response to changes in a core framework, in accordance with some aspects of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. For example, the method 300 may be performed by one or more of the systems or components described with reference to FIG. 1.

Beginning in block 302, a core management platform identifies a change to a function signature of an instruction in a core framework of a computer program. For example the change may impact one or more parameters of a function signature of a function that was updated in the core framework. In some embodiments, the core management platform may identify the change based on a record of changes from an update service or by comparing a new version of the core framework to a previous version of the core framework.

In block 304, the core management system generates a static code analysis rule in view of the change to the function signature in the computer program. For example, the rule may be based on identification of the changed function, the type of change to the function or parameters of the function, or other parameters. The rule may indicate particular functions to be called by a consumer's code as well as an association function signature including parameters to search for. In some embodiments, the rule may include one or more scripts that are triggered upon triggering of the rule within a consumer's code that updates the code to be usable with the updated code.

In block 306, the core management system distributes the generated rules to one or more consumer systems using the core framework with an update to the core framework. For example, the rules may be distributed with, or as part of, a distribution of an updated version of the core framework. In some embodiments, the rules may be distributed with an indication of notification to be provided to a user of the consumer systems. After distribution to client devices, the rules may be tested and implemented against the client's code to ensure proper continued use of core framework with developed products.

Figure 4:
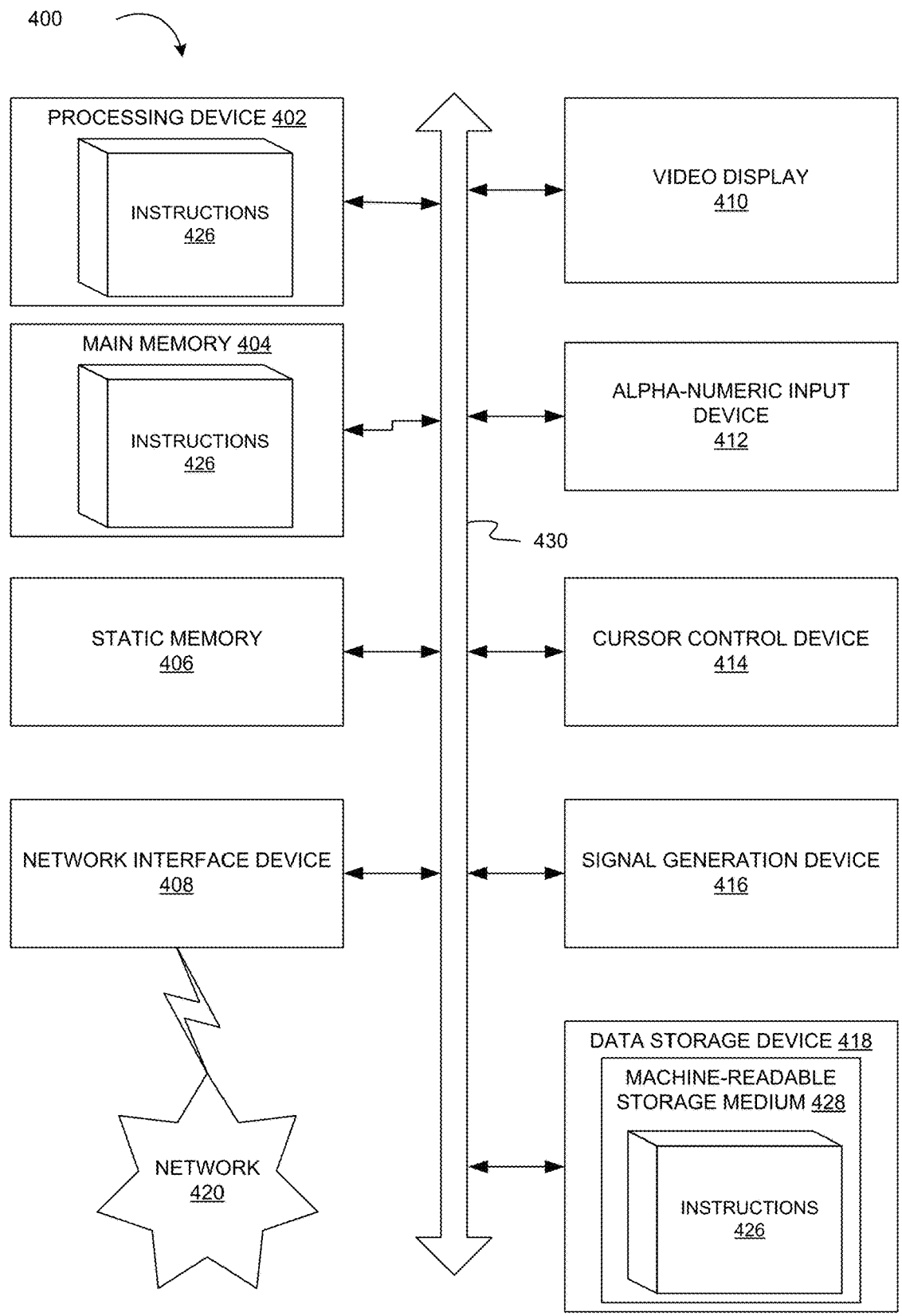
FIG. 4 illustrates an illustrative computer system operating in accordance with one or more aspects of the present disclosure.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426, which may be one example of system 100 shown in FIG. 1, for performing the operations and steps discussed herein.

The data storage device 418 may include a machine-readable storage medium 428, on which is stored one or more set of instructions 422 (e.g., software) embodying any one or more of the methodologies of functions described herein, including instructions to cause the processing device 402 to execute one or more update analysis services as described herein. The instructions 422 may also reside, completely or at least partially, within the main memory 404 or within the processing device 402 during execution thereof by the computer system 400; the main memory 404 and the processing device 402 also constituting machine-readable storage media. The instructions 422 may further be transmitted or received over a network 420 via the network interface device 408.

The machine-readable storage medium 428 may also be used to store instructions to perform a method for analysis of updates to core framework function signatures, as described herein. While the machine-readable storage medium 428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Figure 5:
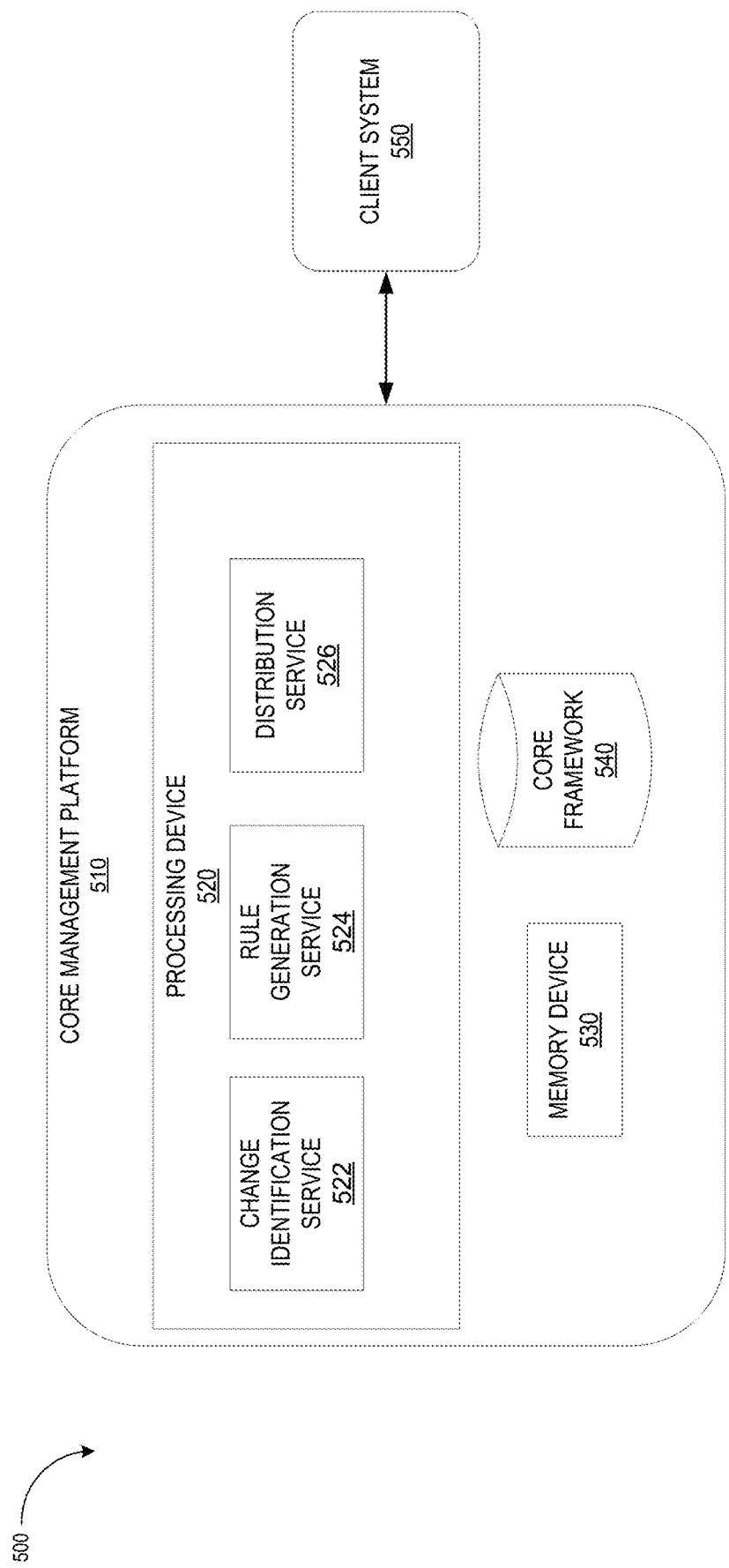
FIG. 5 is a block diagram that illustrates an example of a core management platform in accordance with some aspects of the present disclosure.

FIG. 5 is a block diagram that illustrates an example of a core management platform 510 in accordance with some aspects of the present disclosure. A processing device 520 is coupled to a memory device 530. The processing device may include a change identification service 522, a rule generation service 524, and a distribution service 526. The core framework 540 may be stored in the memory device 530 or other portions of the core management platform 510. As the core management platform updates the core framework 540, the change identification service 522 may identify or record those changes. The rule generation service 524 may then generate corresponding rules based on the identified changes. Those changes may be distributed to client systems 550 by a distribution service 26.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   identifying a change to a function signature of an instruction in a core framework of a computer program;
   determining that the change to the core framework will impact an operation of a client system;
   generating, by a processing device, a static code analysis rule indicating the change to the function signature in the computer program;
   distributing, by the processing device, the static code analysis rule to the client system using the core framework with an update to the core framework;
   identifying one or more calls by the client system to the core framework by analyzing code of the client system in view of the static code analysis rule; and
   in response to identifying the one or more calls to the core framework, triggering, by the static code analysis rule, a remediation script to update the one or more calls to the core framework based on the change to the function signature.

2. The method of claim 1, further comprising:
   determining that the change to the function signature removes a parameter from the instruction; and
   in response to determining that the change to the function signature removes the parameter, generating the remediation script to automatically update an instruction in one or more consumer systems to remove the parameter from the instruction.

3. The method of claim 1, wherein the static code analysis rule generates a notification to one or more consumer systems in response to identification of the instruction within code of the one or more consume systems.

4. The method of claim 1, wherein identifying the change to the function signature of the instruction further comprises comparing the function signature from a first version of the core framework to the function signature from a second version of the core framework.

5. The method of claim 1, wherein the change to the function signature change comprises a change to a parameter type of the instruction, a change to an input parameter of the instruction, or a change to an output parameter of the instruction.

6. The method of claim 1, wherein distributing the static code analysis rule to one or more consumer systems comprises publishing the static code analysis rule to a distribution system automatically available to the one or more consumer systems.

7. The method of claim 1, wherein generating the static code analysis rule further comprises:
   determining that a parameter in the function signature changed from a first parameter type to a second parameter type; and
   in response to the parameter change from the first parameter type to a second parameter type, generating a script to update the parameter type in response to the static code analysis rule identifying the function signature.

8. A core framework system comprising:
   a memory device; and
   a processing device operatively coupled to the memory device, the processing device to:
   identify a change to an instruction in a core framework of a computer program that impacts execution of code of a consumer system calling the instruction by analyzing code of the computer program;
   generate a code analysis rule indicating the change to the instruction in the computer program; and
   distribute the code analysis rule to the consumer system of the core framework with an update to the core framework;
   identify one or more calls by the consumer system to the core framework by analyzing code of the consumer system in view of the code analysis rule; and
   in response to identifying the one or more calls to the core framework, trigger, by the code analysis rule, a remediation script to update the one or more calls to the core framework based on the change to the instruction.

9. The core framework system of claim 8 the processing device further to:
   determine that the change to the instruction removes a parameter from the instruction; and
   in response to determining that the change to the instruction removes the parameter, generate the remediation script to automatically update an instruction in one or more consumer systems to remove the parameter from the instruction.

10. The core framework system of claim 8, wherein the code analysis rule generates a notification to one or more consumer systems in response to identification of the instruction within code of the one or more consume systems.

11. The core framework system of claim 8, wherein to identify the change to the instruction the processing device is further to compare a first version of the core framework to a second version of the core framework.

12. The core framework system of claim 8, wherein the change to the instruction change comprises a change to a parameter type of the instruction, a change to an input parameter of the instruction, or a change to an output parameter of the instruction.

13. The core framework system of claim 8, wherein to distribute the code analysis rule to one or more consumer systems the processing device is further to publish the code analysis rule to a distribution system automatically available to the one or more consumer systems.

14. The core framework system of claim 8, wherein to generate the code analysis rule the processing device is further to:
   determine that a parameter in the instruction changed from a first parameter type to a second parameter type; and
   in response to the parameter change from the first parameter type to a second parameter type, generate a script to update the parameter type in response to the code analysis rule identifying the instruction.

15. The core framework system of claim 8, wherein the change to the instruction is a change to a function signature of a function in a library of the core framework.

16. A non-transitory computer-readable storage medium including instructions that, when executed by a processing device, cause the processing device to:
   receive a rule identifying a change to a function signature of an instruction in a core framework of a computer program executed by a client system by downloading a static code analysis rule in response to receiving an indication of an updated core framework;
   identify one or more calls by the client system to the core framework to execute the instruction by analyzing code of the client system in view of the rule using the static code analysis rule generated by a code management platform managing the core framework; and
   in response to identifying the one or more calls to the core framework to execute the instruction, trigger, by the rule, a remediation script to update the one or more calls to the core framework based on the change to the function signature.

17. The non-transitory computer-readable storage medium of claim 16, wherein the processing device is further to execute the remediation script in response to determining that the instruction is called by the computer program.

18. The non-transitory computer-readable storage medium of claim 16, wherein in response to determining that the rule is triggered, the processing device is further to generate a user interface to provide a recommendation to update the computer program.

* * * * *